(12) United States Patent
Warnock et al.

(10) Patent No.: US 8,311,946 B1
(45) Date of Patent: Nov. 13, 2012

(54) METHOD AND APPARATUS FOR IMPROVED INFORMATION TRANSACTIONS

(75) Inventors: Christopher Warnock, Los Altos, CA (US); Ken Abrams, Campbell, CA (US); Rick Holzgrafe, San Jose, CA (US)

(73) Assignee: Ebrary, Palo Alto, CA (US)

(*) Notice: Subject to any disclaimer, the term of this patent is extended or adjusted under 35 U.S.C. 154(b) by 0 days.

(21) Appl. No.: 09/498,944

(22) Filed: Feb. 4, 2000

Related U.S. Application Data

(60) Provisional application No. 60/159,737, filed on Oct. 15, 1999.

(51) Int. Cl.
  G06F 21/00 (2006.01)
  G06Q 20/00 (2006.01)
(52) U.S. Cl. .......................... 705/52; 705/77
(58) Field of Classification Search .............. 705/51–56, 705/57, 58, 59; 713/200, 193, 201, 185
See application file for complete search history.

(56) References Cited

U.S. PATENT DOCUMENTS

| | | | | | |
|---|---|---|---|---|---|
| 4,404,649 | A | * | 9/1983 | Nunley et al. | 235/379 |
| 4,941,170 | A | * | 7/1990 | Herbst | 379/100.07 |
| 5,068,888 | A | * | 11/1991 | Scherk et al. | 379/100.11 |
| 5,196,943 | A | * | 3/1993 | Hersee et al. | 358/403 |
| 5,237,157 | A | * | 8/1993 | Kaplan | 235/375 |
| 5,237,673 | A | * | 8/1993 | Orbits et al. | 711/170 |
| 5,247,575 | A | * | 9/1993 | Sprague et al. | 705/53 |
| 5,291,405 | A | * | 3/1994 | Kohari | 715/205 |
| 5,295,181 | A | * | 3/1994 | Kuo | 379/100.07 |
| 5,307,452 | A | | 4/1994 | Hahn et al. | |
| 5,327,265 | A | * | 7/1994 | McDonald | 358/527 |
| 5,421,779 | A | * | 6/1995 | Castro | 462/8 |
| 5,444,779 | A | * | 8/1995 | Daniele | 399/366 |
| 5,465,299 | A | * | 11/1995 | Matsumoto et al. | 713/176 |
| 5,486,686 | A | * | 1/1996 | Zdybel et al. | 235/375 |
| 5,509,074 | A | * | 4/1996 | Choudhury et al. | 713/176 |

(Continued)

FOREIGN PATENT DOCUMENTS

EP 0881591 12/1998

(Continued)

OTHER PUBLICATIONS

"jar-The Java Archive Tool" Sun Microsystems as taken from— http://web.archive.org/web/20030418074845/http://java.sun.com/ j2se/1.4.2/docs/tooldocs/windows/jar.ht (Web archive from Apr. 18, 2003).

(Continued)

*Primary Examiner* — James Kramer
*Assistant Examiner* — Nancy Loan Le
(74) *Attorney, Agent, or Firm* — Michael A. Glenn; Glenn Patent Group

(57) ABSTRACT

A mechanism gives users meaningful access to information while protecting the interests of publishers and creators of information including text, graphics, photos, executable files, data tables, audio, video, and three dimensional data and allows a user to review a document while connected to a network but prevents the user from downloading, printing, or copying the document unless a fee is paid. The user is allowed to review documents at a first cost basis, but only provides other access to documents, such as copying, printing, or downloading on a second cost basis. The user is also allowed to purchase a selectable portion of a document at a price based on the amount of material selected where that amount of material can include a portion of a document, an entire document, or an anthology of components of multiple documents.

39 Claims, 11 Drawing Sheets

U.S. PATENT DOCUMENTS

| | | | | |
|---|---|---|---|---|
| 5,513,013 | A * | 4/1996 | Kuo | 358/448 |
| 5,532,920 | A * | 7/1996 | Hartrick et al. | 715/234 |
| 5,546,528 | A | 8/1996 | Johnson | 705/52 |
| 5,592,549 | A * | 1/1997 | Nagel et al. | 705/52 |
| 5,598,279 | A * | 1/1997 | Ishii et al. | 358/402 |
| 5,619,247 | A * | 4/1997 | Russo | 348/3 |
| 5,625,711 | A * | 4/1997 | Nicholson et al. | 382/224 |
| 5,629,980 | A * | 5/1997 | Stefik et al. | 705/54 |
| 5,629,981 | A * | 5/1997 | Nerlikar | 713/168 |
| 5,643,064 | A | 7/1997 | Grinderslev | 451/378 |
| 5,664,109 | A * | 9/1997 | Johnson et al. | 705/2 |
| 5,673,316 | A * | 9/1997 | Auerbach et al. | 705/51 |
| 5,680,479 | A * | 10/1997 | Wang et al. | 382/176 |
| 5,696,841 | A | 12/1997 | Nakatsuka | |
| 5,701,500 | A | 12/1997 | Ikeo et al. | |
| 5,729,637 | A | 3/1998 | Nicholson | 382/282 |
| 5,737,599 | A * | 4/1998 | Rowe et al. | 707/10 |
| 5,754,308 | A * | 5/1998 | Lopresti et al. | 358/403 |
| 5,781,785 | A | 7/1998 | Rowe | 395/774 |
| 5,790,793 | A * | 8/1998 | Higley | 709/218 |
| 5,802,518 | A * | 9/1998 | Karaev et al. | 1/1 |
| 5,819,092 | A * | 10/1998 | Ferguson et al. | 717/113 |
| 5,819,301 | A | 10/1998 | Rowe | 707/513 |
| 5,832,530 | A | 11/1998 | Paknad | 707/500 |
| 5,835,530 | A * | 11/1998 | Hawkes | 375/225 |
| 5,848,184 | A | 12/1998 | Taylor et al. | |
| 5,860,074 | A | 1/1999 | Rowe | 707/526 |
| 5,881,230 | A * | 3/1999 | Christensen et al. | 709/203 |
| 5,892,900 | A * | 4/1999 | Ginter et al. | 726/26 |
| 5,930,813 | A | 7/1999 | Padgett | 707/536 |
| 5,933,498 | A * | 8/1999 | Schneck et al. | 705/54 |
| 5,949,555 | A * | 9/1999 | Sakai et al. | 358/462 |
| 5,982,956 | A * | 11/1999 | Lahmi | 382/306 |
| 5,987,480 | A * | 11/1999 | Donohue et al. | 715/207 |
| 5,991,780 | A * | 11/1999 | Rivette et al. | 715/255 |
| 5,999,649 | A | 12/1999 | Nicholson | 382/190 |
| 6,006,240 | A | 12/1999 | Handley | |
| 6,012,083 | A * | 1/2000 | Savitzky et al. | 709/202 |
| 6,041,316 | A * | 3/2000 | Allen | 705/52 |
| 6,047,377 | A * | 4/2000 | Gong | 726/26 |
| 6,049,339 | A | 4/2000 | Schiller | 345/435 |
| 6,070,158 | A * | 5/2000 | Kirsch et al. | 1/1 |
| 6,119,124 | A * | 9/2000 | Broder et al. | 1/1 |
| 6,134,552 | A * | 10/2000 | Fritz et al. | 707/10 |
| 6,157,924 | A * | 12/2000 | Austin | 1/1 |
| 6,185,684 | B1 * | 2/2001 | Pravetz et al. | 713/182 |
| 6,192,165 | B1 * | 2/2001 | Irons | 382/306 |
| 6,205,456 | B1 * | 3/2001 | Nakao | 715/201 |
| 6,212,530 | B1 * | 4/2001 | Kadlec | |
| 6,272,488 | B1 * | 8/2001 | Chang et al. | 707/769 |
| 6,282,653 | B1 * | 8/2001 | Berstis et al. | 726/26 |
| 6,289,450 | B1 * | 9/2001 | Pensak et al. | 713/167 |
| 6,289,462 | B1 * | 9/2001 | McNabb et al. | 726/21 |
| 6,321,256 | B1 * | 11/2001 | Himmel et al. | 709/219 |
| 6,324,265 | B1 * | 11/2001 | Christie et al. | 379/88.23 |
| 6,327,600 | B1 * | 12/2001 | Satoh et al. | 715/207 |
| 6,345,279 | B1 * | 2/2002 | Li et al. | 1/1 |
| 6,356,936 | B1 * | 3/2002 | Donoho et al. | 709/206 |
| 6,357,010 | B1 * | 3/2002 | Viets et al. | 726/4 |
| 6,363,376 | B1 | 3/2002 | Wiens et al. | |
| 6,385,350 | B1 | 5/2002 | Nicholson | |
| 6,389,541 | B1 * | 5/2002 | Patterson | 726/9 |
| 6,446,068 | B1 | 9/2002 | Kortge | |
| 6,493,763 | B1 * | 12/2002 | Suzuki | 709/231 |
| 6,516,337 | B1 * | 2/2003 | Tripp et al. | 709/202 |
| 6,523,026 | B1 | 2/2003 | Gillis | |
| 6,565,611 | B1 | 5/2003 | Wilcox et al. | |
| 6,606,613 | B1 * | 8/2003 | Altschuler et al. | 706/21 |
| 6,616,337 | B1 | 9/2003 | Smith | |
| 6,629,097 | B1 | 9/2003 | Keith | |
| 6,640,010 | B2 | 10/2003 | Seeger et al. | |
| 6,725,429 | B1 * | 4/2004 | Gardner et al. | 715/234 |
| 6,732,090 | B2 | 5/2004 | Shanahan | |
| 6,870,547 | B1 * | 3/2005 | Crosby et al. | 345/619 |
| 6,920,610 | B1 | 7/2005 | Lawton et al. | |
| 6,988,124 | B2 | 1/2006 | Douceur et al. | |
| 7,069,451 | B1 * | 6/2006 | Ginter et al. | 705/51 |
| 7,079,278 | B2 * | 7/2006 | Sato | 358/1.15 |
| 7,110,126 | B1 * | 9/2006 | Lapstun et al. | 358/1.14 |
| 7,130,831 | B2 * | 10/2006 | Howard et al. | 705/57 |
| 7,133,845 | B1 * | 11/2006 | Ginter et al. | 705/51 |
| 7,290,285 | B2 * | 10/2007 | McCurdy et al. | 726/27 |
| 7,536,561 | B2 | 5/2009 | Warnock et al. | |
| 2002/0042793 | A1 | 4/2002 | Choi | |
| 2002/0065857 | A1 | 5/2002 | Michalewicz et al. | |
| 2002/0138528 | A1 | 9/2002 | Gong et al. | |
| 2002/0143807 | A1 * | 10/2002 | Komatsu | 707/500 |
| 2003/0033288 | A1 | 2/2003 | Shanahan | |
| 2003/0037094 | A1 | 2/2003 | Douceur et al. | |
| 2003/0037181 | A1 | 2/2003 | Freed | |
| 2003/0061200 | A1 | 3/2003 | Hubert | |
| 2003/0185448 | A1 | 10/2003 | Seeger et al. | |
| 2004/0030680 | A1 | 2/2004 | Veit | |
| 2004/0133544 | A1 | 7/2004 | Kiessig | |
| 2004/0133545 | A1 | 7/2004 | Kiessig | |
| 2004/0133588 | A1 | 7/2004 | Kiessig | |
| 2004/0133589 | A1 | 7/2004 | Kiessig | |
| 2004/0205448 | A1 | 10/2004 | Grefenstette | |
| 2004/0239681 | A1 * | 12/2004 | Robotham et al. | 345/581 |
| 2005/0022114 | A1 | 1/2005 | Shanahan | |
| 2005/0044487 | A1 | 2/2005 | Bellegarda et al. | |

FOREIGN PATENT DOCUMENTS

| | | |
|---|---|---|
| EP | 0881591 A1 | 12/1998 |
| EP | 0881592 | 12/1998 |
| EP | 0881592 A1 | 12/1998 |
| EP | 0 881 592 B2 | 10/2002 |
| EP | 1 284 461 A1 | 2/2003 |
| EP | 0 881 591 B1 | 9/2003 |
| JP | 2001-175807 | 6/2001 |
| JP | 2001175807 | 6/2001 |
| WO | WO 96/27155 | 9/1996 |
| WO | WO 98/42098 | 9/1998 |
| WO | WO 99/05618 | 4/1999 |
| WO | WO 99/39286 | 5/1999 |
| WO | WO 01/20596 A1 | 3/2001 |
| WO | WO 01/57711 A1 | 9/2001 |
| WO | WO 02/41170 A2 | 5/2002 |
| WO | WO 2004/051555 A2 | 6/2004 |
| WO | WO 2005/082192 A1 | 7/2005 |

OTHER PUBLICATIONS

Song, W. et al.; "A semantic similarity approach to electronic document modeling and integration"; Jne 2000, Proc. of the 1st Int'l Web Information Systems Engineering Conference on Hong Kong, Los Alamitos, CA, pp. 116-124.

Mani I Ed et al.; "Recent developments in text summarization"; Nov. 5, 2001; proc. of the 2001 ACM CIKM10th Int'l Conf. on Information and Knowledge Management; Atlanta, GA, pp. 529-531.

Carchiolo, V. et al.; "Improving WEB usability by categorizing information"; Oct. 2003; Proc. Int'l Conf. on Web Intelligence; Piscataway, NJ, pp. 146-152.

European Search Report mailed Aug. 20, 2010 for related European patent application No. EP06748238, 7 pages.

Chen, Liren, et al.; "WebMate: a personal agent for browsing and searching"; 1998; Proc. of the 2nd Int'l Conf. on Autonomous Agents; pp. 132-139.

Zamir, Oren et al.; "Grouper: a dynamic clustering interface to Web search results"; 1999; Proc. of the 2nd Int'l Conf. on World Wide Web; Toronto, Canada, pp. 1361-1374.

Cattoni et al, Geometric Layout Analysis Techniques for Document Image Understanding: a Review, ITC-IRST Technical Report #9703-09, Jan. 1998, pp. 1-68, XP002229195 Trento, Italy.

Figa, E., et al., "Lexical Inference Mechanisms for Text Understanding and Classification," 2003, Proceedings of the 66th ASIST Annual Meeting, Humanizing Information Technology: From Ideas to Bits and Back, ASIST 2003, Information Today, INC., pp. 165-173, Medford, NJ, USA.

Parodi, P., et al., "Efficient and Flexible Text Extraction from Document Pages," Dec. 1999; International Journal on Document Analysis and Recognition, vol. 2, No. 2-3, pp. 67-79, Springer-Verlag, Germany.

Yan-Min Chen, et al., "Multi-Document Summarization Based on Lexical Chains," 2005, Proceedings of 2005 International Conference on Machine Learning and Cybernetics, IEEE, Piscataway, NJ, USA.

Guoren Wang, et al., "Design and Implementation of a Semantic Document Management System," Jan. 2005, Information Technology Journal, vol. 4, No. 1, pp. 21-31, Pakistan.

Mouri, T., et al., "Extracting New Topic Contents from Hidden Web Sites," 2004, Proceedings ITCC 2004, International Conference on Information Technology: Coding and Computing, IEEE Comput. Soc., vol. 1, pp. 314-319, Los Alamitos, CA, USA.

Srihari, S.N., et al., "Forensic Handwritten Document Retrieval System," 2004, Proceedings First Workshop on Document Image Analysis for Libraries, IEEE Comput. Soc, pp. 188-194, Los Alamitos, CA, USA.

Estievenart, F., et al., "A Tool-Supported Method to Extract Data and Schema from Web Sites," 2003, Proceedings Fifth IEEE International Workshop on Web Site Evolution Theme, Architecture, IEEE Comput. Soc, pp. 3-11, Los Alamitos, CA, USA.

Chuan-Jie Lin, et al., "Description of Preliminary Results to TREC-8 QA Task," 2000, Information Technology: Eighth Text Retrieval Conference (TREC-8) (NIST SP 500-246), pp. 507-512, NIST, Gaithersburg, MD, USA.

Embley, D.W., et al., "Conceptual-Model-Based Data Extraction from Multiple-Record Web Pages," Nov. 1999, Data & Knowledge Engineering, vol. 31, No. 3, pp. 227-251, Elsevier, Netherlands.

Embley, D.W., et al., "A Conceptual-Modeling Approach to Extracting Data from the Web," 1998, Conceptual Modeling—ER'98, 17th International Conference on Conceptual Modeling, Proceedings pp. 78-91, Springer-Verlag, Berlin, Germany.

Bartal, "Probabilistic Approximation of Metric Spaces and Its Algorithmic Applications," 1996, In: FOCS Proceedings of the 37th Annual Symposium on Foundations of Computer Science. Washington DC, IEEE, Abstract, pp. 2-3, ISSN 0272-5428.

Zhang, et al., "BIRCH: An Efficient Data Clustering Method for Very Large Databases," 1996, In: ACM Sigmod Record, Proceedings of the 1996 ACM SIGMOD International Conference on Management of Data, New York: ACM Press, vol. 25, Issue 2, pp. 103-114, ISSN 0163-5808.

Figa, E. et al.; Lexical Inference Mechanisms for Text Understanding and Classification; Proceedings of the 66th ASIST Annual Meeting. Humanizing Information Technology; From Ideas to Bits and Back. ASIST 2003 p. 165-173; Information Today, INC., Medford, NJ, USA: 2003.

Parodi, P. et al.; Efficient and Flexible Text Extraction from Document Pages; International Journal on Document Analysis and Recognition vol. 2, No. 2-3 p. 87-79; Springer-Verlag; Dec. 1999: Germany.

Yan-Min Chen et al.; Multi-Document Summarization Based on Lexical Chains; Proceedings of 2005 International Conference on Machine Learning and Cybernetics (IEEE, Piscataway, NJ, USA: 2005.

Guoren Wang et al.; Design and Implementation of a Semantic Document Management System; Information Technology Journal vol. 4, No. 1 p. 21-31; Jan. 2005; Pakistan.

Mouri, T. et al.; Extracting New Topic Contents from Hidden Web Sites; Proceedings. ITCC 2004. International Conference on Information Technology: Coding and Computing vol. 1 p. 314-319; IEEE Comput. Soc. Los Alamitos, CA, USA; 2004.

Srihari, S.N. et al.; Forensic Handwritten Document Retrieval System; Proceedings. First Workshop on Document Image Analysis for Libraries p. 188-194; IEEE Comput. Soc, Los Alamitos, CA USA: 2004.

Estievenart, F. et al.; A Tool-Supported Method to Extract Data and Schema from Web Sites; Proceedings Fifth IEEE International Workshop on Web Site Evolution Theme: Architecture p. 3-11: IEEE Comput. Soc. Los Alamitos, CA, USA: 2003.

Chuan-Jie Lin et al.; Description of Preliminary Results to TREC-8 QA Task; Information Technology: Eighth Text Retrieval Conference (TREC-8) (NIST SP 500-248) p. 507-512; NIST Gaithersburg MD USA 2000.

Embley, D.W. et al.; Conceptual-Model-Based Data Extraction from Multiple-Record Web Pages: Data & Knowledge Engineering vol. 31 No. 3 p. 227-251: Elsevier; Nov. 1999; Netherlands.

Embley, D.W. et al.; A Conceptual-Modeling Approach to Extracting Data from the Web; Conceptual Modeling—ER'98, 17th International Conference on Conceptual Modeling. Proceedings p. 78-91: Springer-Verlag, Berlin, Germany: 1998.

Knoll, A. et al.; An Integrated Approach to Semantic Evaluation and Content-Based Retrieval of Multimedia Documents; Research and Advanced Technology for Digital Libraries. Second European Conference, ECDL'98. Proceedings p. 409-428; Springer-Verlag, Berlin, Germany; 1998.

Fujisawa, H. et al.; Automatically Organizing Document Bases Using Document Understanding Techniques; Future Databases '92. Proceedings of the Second Far-East Workshop on Future Database Systems p. 244-253; World Scientific, Singapore; 1992.

Keshi, I. et al.; A Knowledge-Based Framework in an Intelligent Assistant System for Making Documents; Future Generation Computer Systems vol. 5, No. 1 p. 51-58; Aug. 1989; Netherlands.

* cited by examiner

FIG. 11

METHOD AND APPARATUS FOR IMPROVED INFORMATION TRANSACTIONS

CROSS REFERENCE TO RELATED APPLICATIONS

This application claims priority from provisional patent application 60/159,737, filed Oct. 15, 1999, which is incorporated herein by reference.

FIELD OF THE INVENTION

The present invention relates to methods and systems for providing information over a public data network with access control and paid transactions.

BACKGROUND OF THE INVENTION

At the present time, many people are familiar with accessing information over a data network. For purposes of this discussion, it is helpful to consider two categories of network. Free or public data networks are networks, such as the Internet, where access to the network, and to information publicly posted on the network is provided free of charge and generally free of subscription identifiers or login.

In contrast to free networks, for purposes of this discussion, are subscription or paid information services or networks. In subscription networks, users typically pay some type of periodic usage fee and may also pay for access to particular services or databases. Subscription networks include networks or data systems designed for the public at large, such as AOL™, CompuServe™, or Prodigy™. Subscription networks also include networks or data systems designed for particular professions or interest areas, such as Lexis™ and Westlaw™ in the legal field, Nexis™ for news stories, or Dialog™ for a range of documents including patents, technical publications, and business publications. Some paid information services allow limited searching and viewing of documents for free or after paying a subscription fee, but full access to documents, either for viewing, printing, or downloading, generally requires a fee. In many instances, the fee is a per document or per record charge, though systems have existed that included a per page or per line charge for performing certain actions, such as printing.

It should be understood that paid and free categories are not rigid, and both free and paid services can include some characteristics of the other.

A problem not yet fully addressed, particularly on free networks, is how to compensate copyright owners or information assemblers for access to information or documents that are placed on the free network, while allowing users meaningful access to the data.

A number of prior systems for allowing paid access to information have been developed, but each of these has had shortcomings, as discussed below.

One large document database that is accessible for free over the Internet is the IBM Intellectual Property Network, currently available at http://www.patents.ibm.com/. This service allow free searching in a number of patent databases and allows users, for free, to view a textual representation (generally in HTML format) of the front page of patents and in some case patent claims for free. A user can also view a graphical image of each patent page in a graphical format (generally TIFF) for free and can print or download the graphical scan of the page. However, this graphical format provides reduced usability for the user, because bitmapped text in the TIFF file cannot be searched or selected. File sizes are generally also large and therefore slow to download. Text also cannot be copied from the graphical format. If a user wishes access to the full text of a patent in a text file format, the user pays a fee to download a version of the document. Various file formats, such as PDF, HTML, or TIFF are available for download, but accessing any of these formats requires paying a per-document fee. The service provides very limited paid access to portions of documents. For example, in one option, the user can download the front pages of up to six patents for a single fee. The service does not allow users to print or copy directly from a document at a different cost structure, but has just one paid access, file download. Once a file is downloaded, it is freely and repeatedly viewable or printable by the user and, so far as the software is concerned, it can be freely distributed and copied.

Services that require an initial or ongoing subscription fee are unattractive to consumers who may be one time or very occasional users of the database. Subscription services can, at times, be unattractive to information providers, because requiring subscriptions can reduce service utilization and revenues. Subscription services are, at times, unattractive to creators and publishers because it can be difficult to fairly compensate a particular document creator when a database may contain thousands of documents by thousands of different creators. Services that allow free access to a document after it is downloaded may be unattractive to publishers because once high-quality electronic content is made available, there is no technical restriction on a user from electronically republishing the content.

A number of different document formats are presently available that allow additional information, security features, or computer code to be included in a text/graphic document. The Microsoft Word™ doc document format, for example, can include macros, bookmark and cross-reference information, revision history information, two-password password protection, etc.

The Adobe Acrobat Portable Document Format (PDF), and the PostScript™ layout language on which it is based, also provide mechanisms for including various procedures related to encryption and security. Adobe has also released some technology for managing and distributing secured documents using PDF. Adobe® PDF Merchant™ is server-based software that enables eBook and content providers to sell and distribute documents electronically with security. It is designed to integrate into existing eCommerce and transaction servers, making it easy for publishers, distributors, and retailers to encrypt volumes of Adobe Portable Document Format (PDF) files and sell them over the Web and provides mechanisms for Managing the distribution of electronic keys. Content owners can specify standard Acrobat permissions, including privileges for printing, changing the document, selecting text and graphics, and adding or changing annotations and form fields. Further information is available from http://www.adobe.com/products/pdfmerchant/main.html.

There exist some examples of easily accessible information tools such as definition and thesaurus look-ups. The NeXT operating system, for example, allowed users to click on words and thereby access definitions from a Merriam-Webster® dictionary. Guru-NET is a recent service using similar techniques to provide additional information to users based on indicated text. Many of these systems, such as Guru-NET, for example, fail when attempting to provide information tools access in encoded documents, such as PDF. These systems are not incorporated with systems for paid document access.

What is needed is an information accessing and distribution service that can allow users meaningful access to electronic data or information with a pricing arrangement attractive to both users of the system and information publishers or providers.

SUMMARY OF THE INVENTION

The present invention, in various aspects, involves a method and/or system for distribution of information (including any digital data) on a network. Various embodiments and aspects of the invention operate to give users meaningful access to the information while allowing information owners or distributors to receive fair compensation.

In the present discussion, information available over a public network will be referred as contained in documents. It should be understood that the terms information or document refer to any type of digitally-encoded data that can be presented or transmitted by a computer or other digital device including, but not limited to, text, graphics, photos, executable files, data tables, audio, video, three dimensional data, or multimedia data that is a combination of any of these.

In a further embodiment, the invention comprises a new method for allowing a user to review a document white connected to a network, but prevents the user from downloading, printing, or copying the document without receiving an additional authorization or transaction.

In a further embodiment, the invention comprises a new method for allowing a user to review documents at a first cost basis (which in a preferred embodiment will be free, while in other embodiments some type of cost may be involved), while providing other access to documents, such as copying, printing, or downloading, on a second cost basis.

In a further embodiment, the invention comprises a new method for allowing a user to access a user selectable portion of a document at a price based on the amount of access selected to a fine granularity. Material selected can include a user-selectable portion of a document, down to a word for copying, an entire document, or an anthology of components of multiple documents. Different actions may be allowed on different portions of documents, for example, a publisher my allow a user to print an entire document, but may only electronically allow a user to copy a limited portion of a document.

In a further embodiment, the invention can be understood as a system that allow access to documents for viewing at no cost or a reduced cost and that requires a per action fee each time other actions are desired on a document. In contrast to prior art systems, even after a first printing of a document, the present invention in this embodiment continues to maintain protection for the information contained in the document and to restrict access as a publisher specifies.

In a further embodiment, the invention comprises a new method for tracking and compensating creators of material when that material is accessible from a document database and in a further embodiment when that material is incorporated into a document that may contain material created by others and for which others are compensated.

A further understanding of the invention can be had from the detailed discussion of specific embodiments below. For purposes of clarity, this discussion refers to devices, methods, and concepts in terms of specific examples. However, the method of the present invention may operate in a wide variety of applications. It is therefore intended that the invention not be limited except as provided in the attached claims.

Furthermore, it is well known in the art that computer systems can include a wide variety of different components and different functions in a modular fashion. Different embodiments of the present invention can include different mixtures of elements and functions and may group various functions as parts of various elements. For purposes of clarity, the invention is described in terms of systems that include different innovative components and innovative combinations of components. No inference should be taken to limit the invention to combinations containing all of the innovative components listed in any illustrative embodiment in this specification.

Furthermore, it is well known in the art of internet applications and software systems that particular file formats, languages, and underlying methods of operation may vary. The disclosure of a particular implementation language or format of an element should not be taken to limit the invention to that particular implementation unless so provided in the attached claims.

All publications, patents, and patent applications cited herein are hereby incorporated by reference in their entirety for all purposes. The invention will be better understood with reference to the following drawings and detailed description.

BRIEF DESCRIPTION OF THE DRAWINGS

FIGS. 9-16 are example screen images from an exemplary embodiment.

DESCRIPTION OF SPECIFIC EMBODIMENTS

1. Methods of Operation 1.1 Providing Secure Access to a Document

Figure 1:
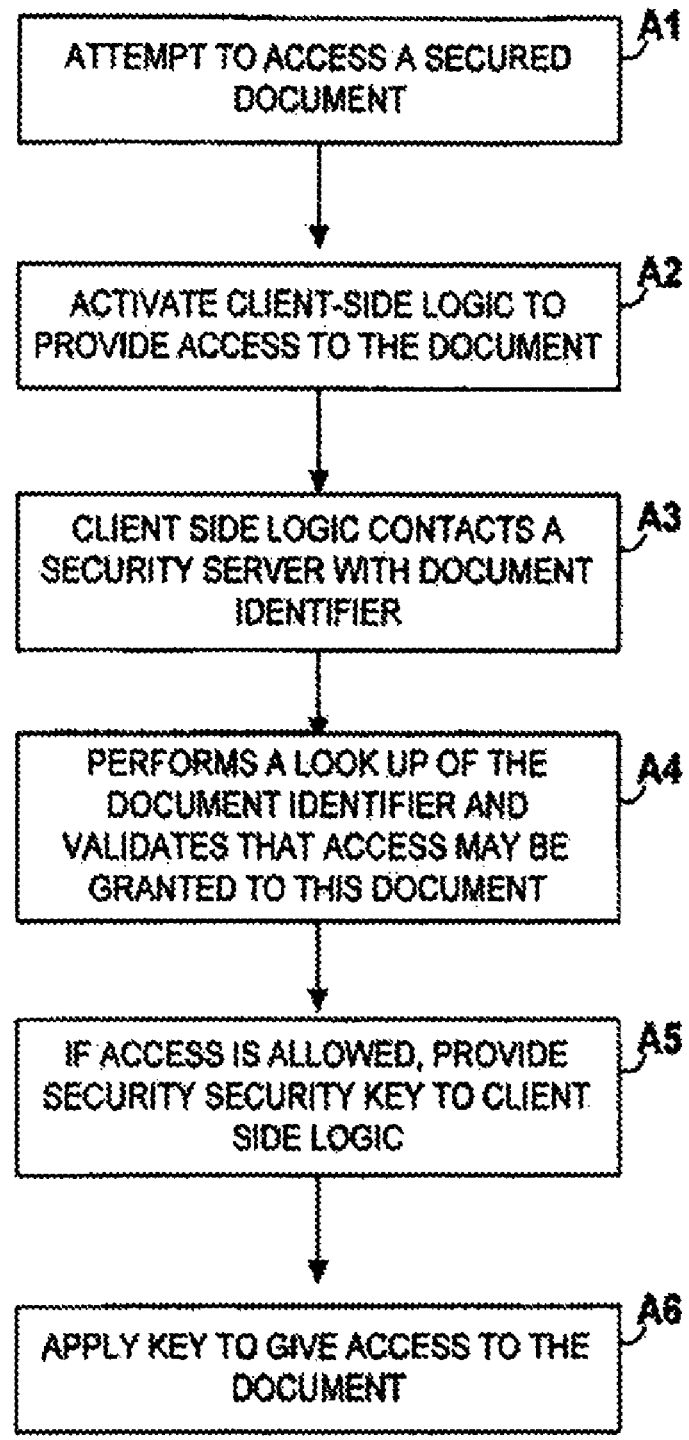
FIG. 1 is a flow chart illustrating a method for providing secure access to a document according to a specific embodiment of the invention.

FIG. 1 is a flow chart illustrating a method for providing secure access to a document according to a specific embodiment of the invention.

According to this embodiment, when a user first attempts to access a secured document according to the invention (Step A1), client-side logic is activated to provide access to the document (Step A2). Without this client-side logic, the user cannot access the document because of the security features in the document. The client side logic then contacts a security server with a document identifier derived from the document (Step A3). The security server performs a look up of the document identifier and validates that access may be granted to this document (Step A4) based on the document identification and possibly other factors (such as, but not limited to, any combination of: a user's identification, presence of a valid and active charging account, a user's network address, a user's age verification, etc.). If validation is indicated, the security server transmits back to client side logic a security key that may be used to access the document (Step A5). If validated, the client-side logic then applies the key to give access to the document (Step A6).

Application of the security key to "unlock" the document can be performed in a variety of ways. In one embodiment, the majority of data in the document (other than the document id and possibly other citation or abstract data) is encrypted using a standard encryption scheme, such as PGP. Each document has its own key, which is kept at the security server indexed by document identification. The security key and request for the security key that pass between the client-side logic and the security server may be further encrypted using a secure data channel via public-key encryption or other encryption method(s) so that the key can only be decoded and applied by the client-side logic requesting it.

According to one embodiment of the invention, a security feature enables documents to be freely browsed from a network location but does not allow documents to be copied or downloaded in any meaningful way because the file is encrypted and cannot be accessed without the client-side logic of the invention. In a further embodiment, the invention does not allow downloading of documents from the server, only serving of portions to be viewed from the documents. In this embodiment, the client-side logic will only allow decrypting the document as the document is currently being served from the server. Once the client-side logic is used to access the invention, the logic restricts the types of actions that can be performed on the document and ensures that the specified fee is paid before allowing certain transactions.

In one specific embodiment, in order to access any secured document, the client side logic must be able to communicate with a security server before the logic allows access to the document. The security server provides the security key allowing access to the document.

In various embodiments, the client-side logic may be incorporated into a plug-in that operates cooperatively with a browser or viewer. As understood in the art, the plug-in will then be available when the browser is running.

In another embodiment, the client-side logic may be installed as an independent service under the operating system as system routines or an independent application. In this embodiment, access and security features, according to the invention, may be provided for files accessed outside of a browser and accessed locally.

In an alternative further embodiment, a user cannot save a secured document. This prevents modified or insecure copies from being created and distributed.

It will be seen that in one embodiment of the method just described, in general terms, access to documents is restricted on a per use and a per action basis. Even if a document is allowed to be downloaded to a local system, each attempt to perform an action on a document will require activation of the security logic of the present invention and may require a security key. Thus, even where information is allowed to be downloaded to a system and freely viewed, other actions such as copying, printing, may be restricted or may be allowed only after payment of the required fee each time the action is requested.

As a first aspect, an access method according to the invention will detect and interrupt copying, printing or other actions on a document if that document was formatted according to the invention. The invention determines this if the invention necessarily and successfully used its security features to open the document. If so, the invention software remembers and keeps this knowledge. When the document is closed, the invention determines this and deletes the record.

Once it is determined that a document is one constructed according to the invention, for predefined restricted actions, the invention interrupts standard handling and substitutes or inserts custom handling. Control is passed to the default handler if a document is not one created in accordance with the invention.

1.2 Requesting a Paid Action

Figure 2:
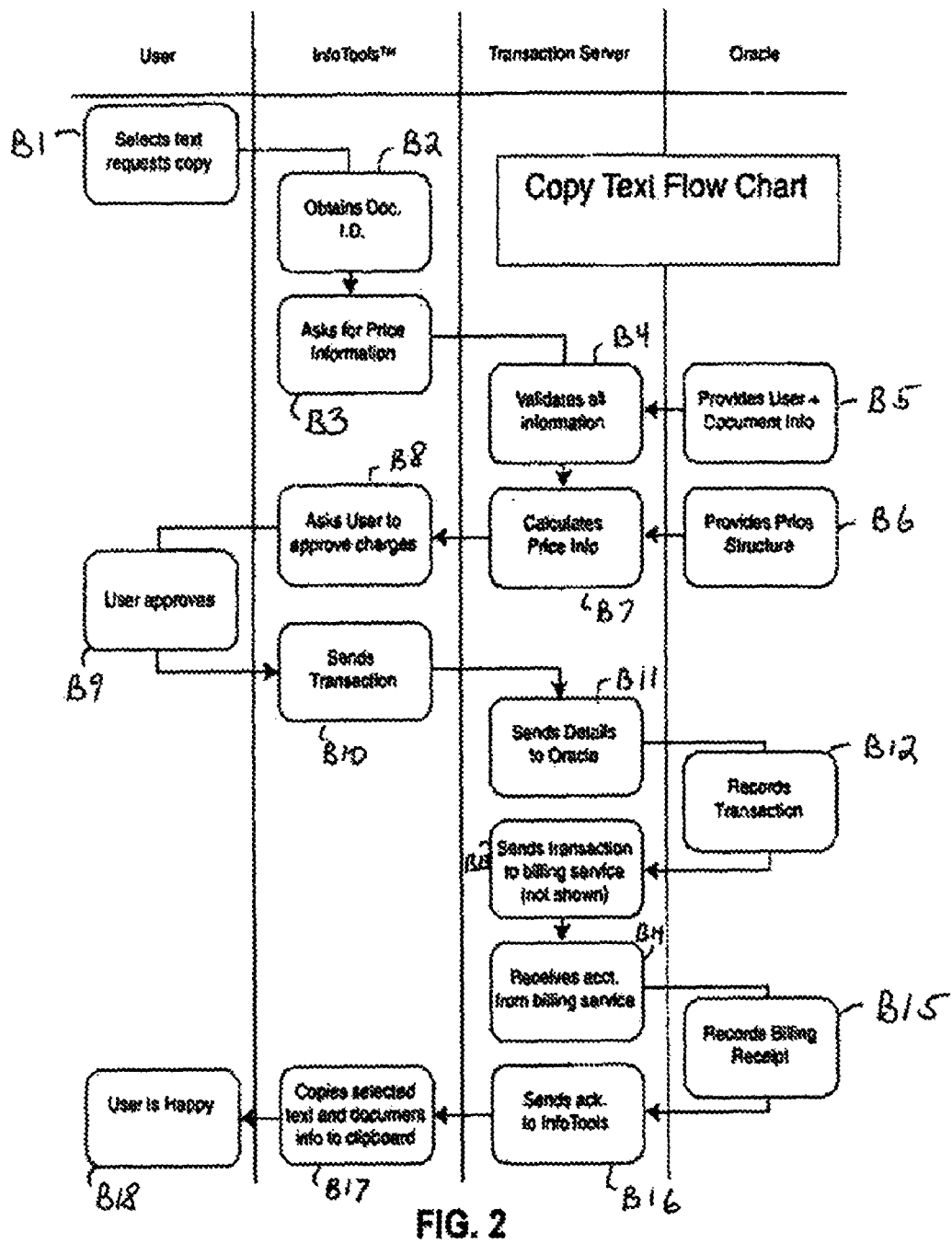
FIG. 2 is a flow chart illustrating a method for allowing a paid action according to an embodiment of the invention.

FIG. 2 is a flow chart illustrating a method for allowing a paid action according to an embodiment of the invention. In this example, the method shown is for access of text information to request to copy a portion of information. However, accessing information for any other type of action (such as printing, downloading, playing, etc.) may be performed according to the invention by the same general method.

FIG. 2 shows the method in the context of a particular system embodiment, with specific functions performed by four different system participants: a user, a logic module installed on the user's computer (herein at times referred to as InfoTools™ and also understood as client-side logic), a transaction server, and a database server (typically an advanced SQL-type database system.) While the method and other methods described herein may be described in a specific sequence with specific participants performing specific functions, these descriptions should be understood as examples; and variations in accordance with the general methods described in the attached claims are possible.

As shown, this specific embodiment method of the invention commences when a user requests a desired action for an indicated portion of information (Step B1). Requesting an action can take place in a variety of ways as known in the art, but as discussed elsewhere herein, in a preferred embodiment, a user will request a specific action in way with which they are familiar from other applications. For example, in a specific embodiment, a copy action may be requested by using a Control-C or Command-C keystroke (depending on computer platform), a right-click menu, or a menu-bar selection, all as commonly known in the art. Upon detecting a requested action, the client-side logic obtains an identifier for the selected information (Step B2). An identifier for the selected information consists of an identifier for the document plus an identifier for the selected range of text or data within the document (in one embodiment, the latter is the range of pages on which the selection is found). The document identifier is a value invisibly embedded in the document and/or derived from the URL by which the document was obtained from the server.

The client-side logic composes a request for pricing information and transmits that request to a transaction server (Step B3). The transaction server validates the information in the request (Step B4) and receives from a database, user and document information (Step B5). The database also provides price structure (Step B6) and the transaction server calculates price information and transmits that information back to the client side logic (Step B7).

The client-side logic determines if the pricing is approved by the user (Step B8), either by displaying a request for approval to a user or by reference to user setup data. Upon determining user approval (Step B9), the client-side logic sends the transaction to the transaction server (Step B10) which forwards the details (Step B11) to be recorded in the database (Step B12). The transaction server may also send the transaction to a credit card or electronic cash service to complete transfer of funds (Step B13) and receives account information from that service (Step B14), which is also recorded in the database (Step B15). With transaction payment successfully verified, an acknowledgement is sent back to the client side logic (Step B16) which allows the access the user has requested (in a specific embodiment including copying and formatting the selected text and document info such as citation data to the clipboard) (Step B17) to satisfy the user (Step B18).

According to a specific embodiment, document identification and range identification may be specifically provided for according to the invention, or, where these features are available in a standard viewer, the invention may use features from the standard viewer.

Furthermore, for some document formats the process of determining the range for selected text for purposes of performing an action, such as copying, will involve an algorithm that is part of the logic of the invention that will iterate over each rectangle of the selected text that describes the physical location (on a printed or displayed page of text) of each word or portion of a word in the selected text, and from those locations determining the range desired.

1.3 Alternative Method for Requesting a Paid Action

This section discusses a simplified alternative method for performing an action (in this case, the example action is printing). It should be understood that this and the previously described example method can be adapted to a variety of different paid actions, such as, but not limited to, printing, copying, executing, playing, etc.

As in the discussion above, in this example, printing also requires a transaction indication, in this case a user requests a certain number of pages to be printed. In specific embodiments, the invention may generate the cost of printing the page or text ranges based upon the number of pages in a book, the cost of a book, the number of pages being printed, the number of off-line copies being made or other algorithms which can be specified by the content provider.

As shown, this specific embodiment method of the invention commences when a user indicates an action for an indicated portion of information (Step C1). An action options dialog (in a specific embodiment one that is standard for the platform) appears (Step C2) and the user indicates the desired options (Step C3). Another dialog appears (Step C4) in which the user enters his/her identity for accounting purposes (name and password) (this step may be automated according to user preferences) (Step C5). The user's request and identity and the identifier for the indicated portion of information (document ID and page or word range) are sent to a server (Step C6). The server verifies the user's identity (Step C7) and calculates a price for the requested operation (Step C8) and returns that price to the client-side logic (Step C9). The client-side logic determines whether the price will be accepted by the user (Step C10). If declined, the request is cancelled (Step C11). If accepted, all prior information is again transmitted to the server (Step C12) along with the agreed-upon price. The server again verifies all information (Steps C12 and C13) and verifies that the price presented to the user is correct (Step C14). If any verification step fails, the request is cancelled (Step C15). If verification succeeds, the server returns an acknowledgement to the client side logic (Step C16) which then processes the user's request by printing the indicated portion of the information (Step C17).

In a specific embodiment, an access system according to the invention is designed specifically to work with a third-party document viewer that does not directly allow the display of an authorization dialog between the print dialog and printing. Therefore, in this embodiment, the invention intercepts and modifies the interaction with the user during the print process, calling the system-specific print dialog mechanisms directly, bringing up the authorization dialog, completing client/server transactions, and then calling the document viewer's default printing function. In an alternative embodiment, the invention can use a security handler callback that is called between the print dialog and the sending of data to the printer if such callbacks are provided by a particular document viewer.

1.4 Placing Documents into a Repository

Figure 3:
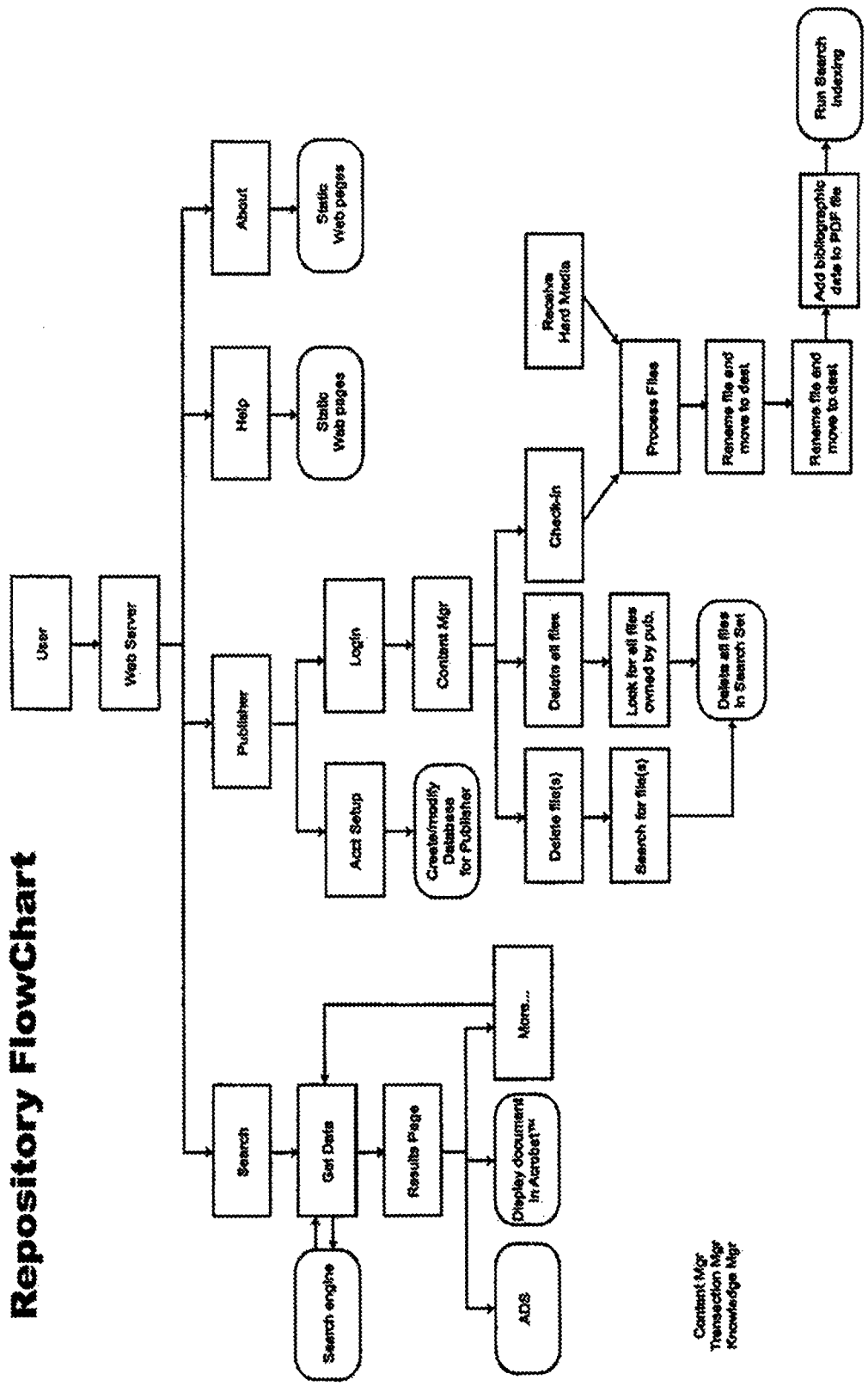
FIG. 3 is a flow chart illustrating a method for accepting documents into a repository and formatting documents for user access according to a specific embodiment of the invention.

FIG. 3 is a flow chart illustrating a method for accepting documents into a repository and formatting documents for user access according to a specific embodiment of the invention. According to the invention, the document repository will hold the system's provided documents and will participate in restricting access to only authorized access.

In various specific embodiments of the invention, the repository may have multiple versions or formats of some or all documents in the repository. For example, a low-resolution version may be available for browsing and a higher version would be available for printing.

Processing of documents for a repository according to the invention may further involve one or more of the following: a check-in and processing feature, addition of security codes, addition of publisher identifications, addition of caption information. In one embodiment, an encryption key is established for each file, and a substantial part of the file is encrypted with the key. In addition, other data fields, such as bibliographic data, ownership or authorship date, etc., are added to the file. To complete check-in and processing of files, files are added to the database index and files are placed into the database.

Also, in one specific embodiment, there is provided a procedure for publishers or owners of information to login to the system and manage their own content. As shown, a publisher can create or modify database properties, review the content of databases, delete files, etc.

1.5 Creating Anthology Documents

Figure 4:
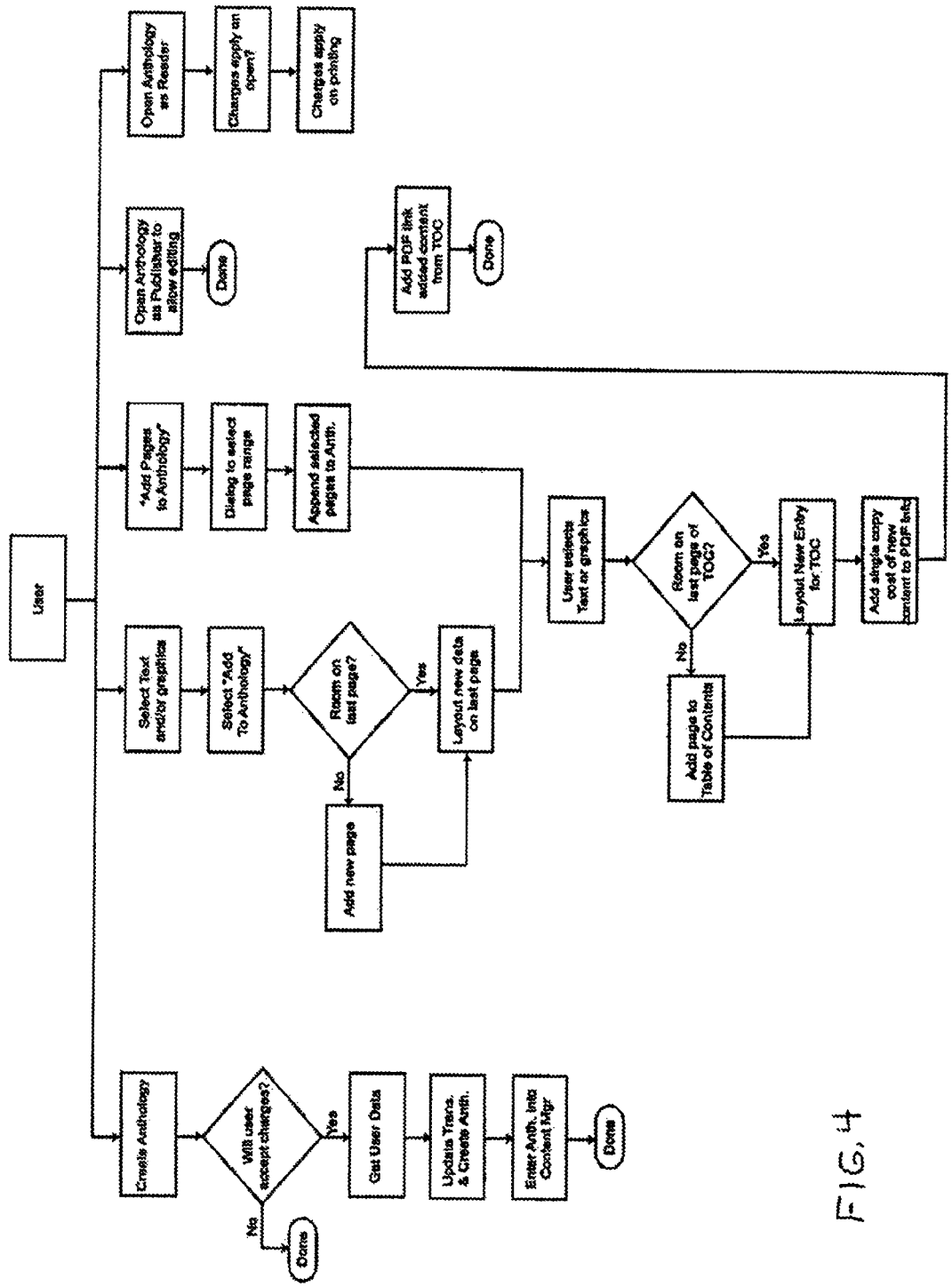
FIG. 4 is a flow chart illustrating a method for creating anthology documents according to a specific embodiment of the invention.

FIG. 4 is a flow chart illustrating a method for creating anthology documents according to a specific embodiment of the invention. This is an optional feature that may be provided in some embodiments of the invention. According to this embodiment, a user interested in an anthology document, such as a course instructor, can selected multiple documents or portions thereof to create an anthology. A single charge can be computer for performing actions on the anthology and discounts or special rates can be applied based on a group discount feature determined by the system administrator or by individual publishers.

1.6 Integrated Information Tools

Figure 5:
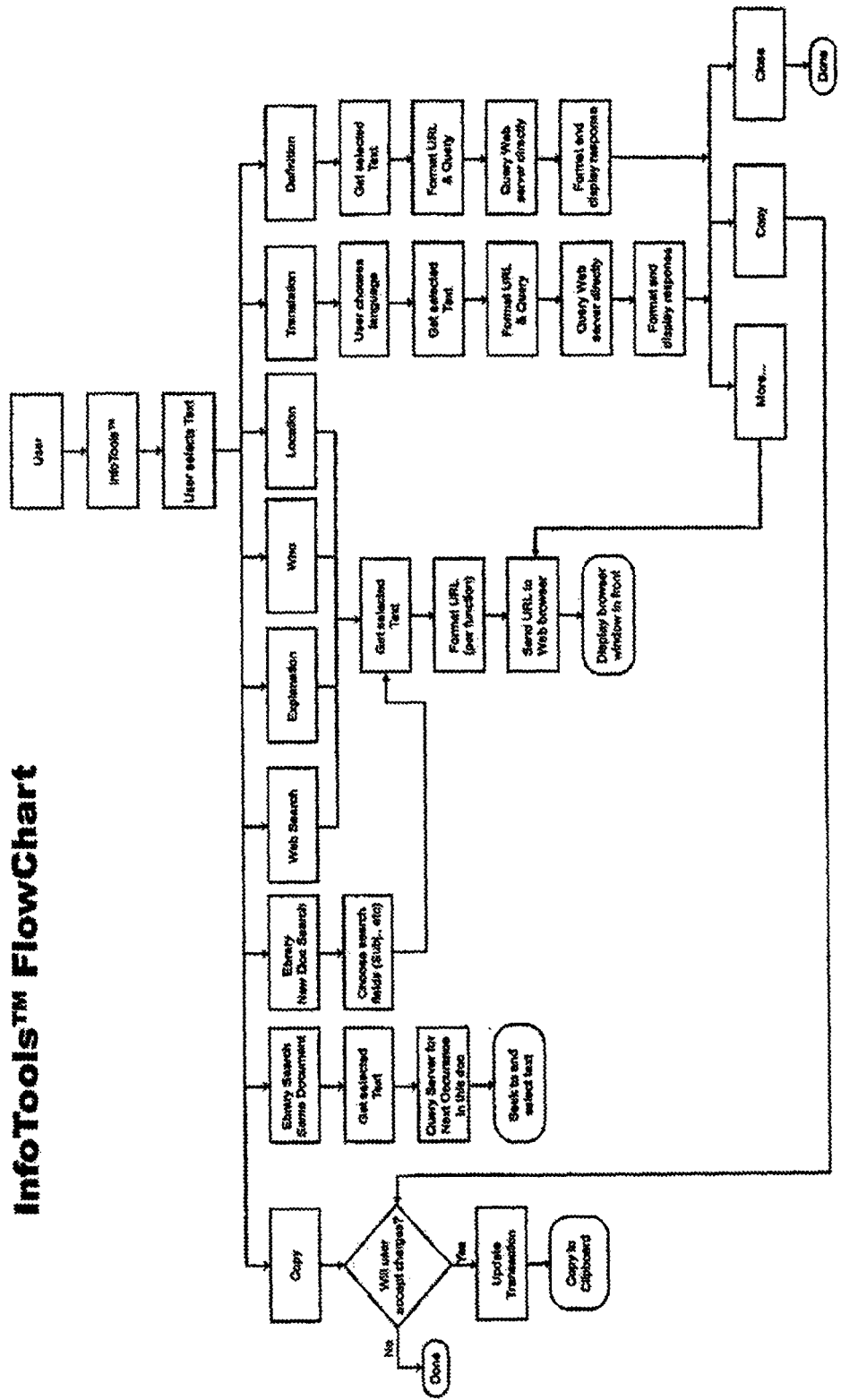
FIG. 5 is a flow chart illustrating a set of information tools integrated with user access to a document database according to a specific embodiment of the invention.

FIG. 5 is a flow chart illustrating a set of information tools integrated with user access to a document database according to a specific embodiment of the invention.

As shown in FIG. 5, in this embodiment, from the user's perspective, a number of information tools are integrated with functions specific to the invention to provide the user seamless access to various information services. In this embodiment, a user can select text, and then, by indicating that text can access functions within the invention's database, such as paid copying, searching within the same document, or searching in the database within other documents. The user can also request information services that may be provided outside of the system of the invention, such as web searching or web-retrieved explanation, personal information, location information, word definitions, or translations services. These features may be activated by user inputs as known in the art, such as keystroke commands, menubar selection, or context-sensitive menu selection based on clicking the selected text. By integrating functions provided by the invention and web-based information services, the invention enhances usability.

1.7 Automatic Citation

According to one embodiment of the invention, the copy procedure can allow for an automatic citation function. This function retrieves bibliographic data stored in the documents or in the &Obese at the server side and adds that data to the copied text Bibliographic data may be formatted according to user options, such as using different font, font effect, or size.

2. System Overview

Figure 6:
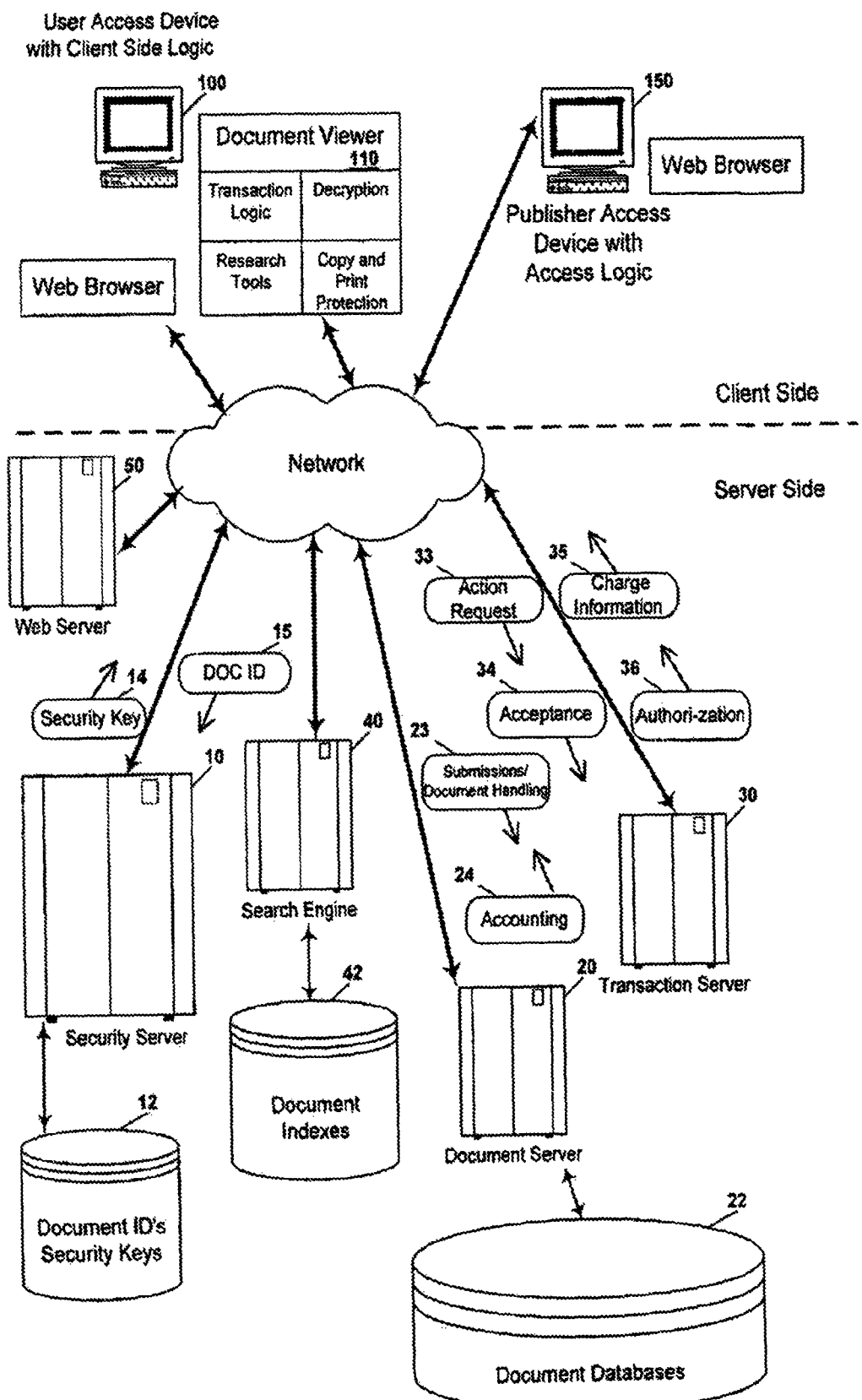
FIG. 6 is a block diagram illustrating an example system and system components according to a specific embodiment of the invention.

FIG. 6 is a block diagram illustrating an example system and system components according to a specific embodiment of the invention. For purposes of explanation, components of the system, such as the security server, search engine, etc., are each shown as individual computing devices. It will be understood to those of skill in the art that this is a representation of one embodiment and that actual implementations can combine most or all of the server side functional components onto a single powerful system or can divide individual functional components on to multiple cooperating systems. Each of the components shown in this and other Figures, to the extent that it is not described in more specific detail herein, should be understood to represent logic components or logic devices that are well-understood in the art and are commercially available through third-party suppliers.

The present invention has thus far been described in terms of general methods and actions. The previous description is intended to be a full and complete description and is believed to be sufficient to allow an ordinary practitioner in the art to use the invention. It will be understood to those of skill in the art that the described invention can be implemented in a wide variety of specific programming environments, using a wide variety of programming languages and wide variety of file types.

What immediately follows are descriptions of example systems that can embody various aspects of the present invention. This following discussion is included, in part, in order to disclose a preferred mode presently contemplated for practicing the invention.

It is intended that the previous discussion and those claims directed to the previous discussion not be limited by examples provided herein. It is further intended that the attached claims be read broadly in light of the previous discussion, unless the claims specifically incorporate details described below. Where specific examples are described in detail, no inference should be drawn to exclude other known examples from the broad description of the invention or the language of the claims. It is therefore intended that the invention not be limited except as provided in the attached claims and all allowable equivalents thereof.

3. Document Format

Figure 7:
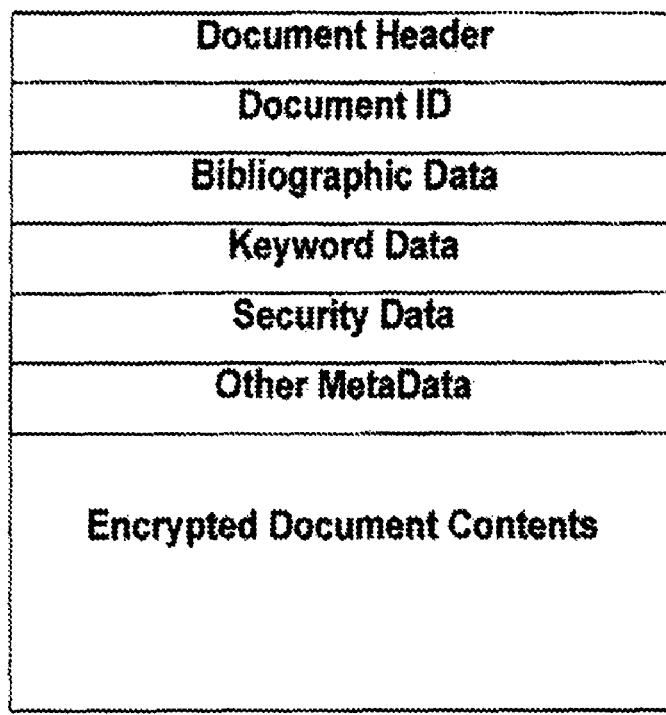
FIG. 7 is a block diagram illustrating an example document or format with security and encryption fields according to a specific embodiment of the invention.
Figure 8:
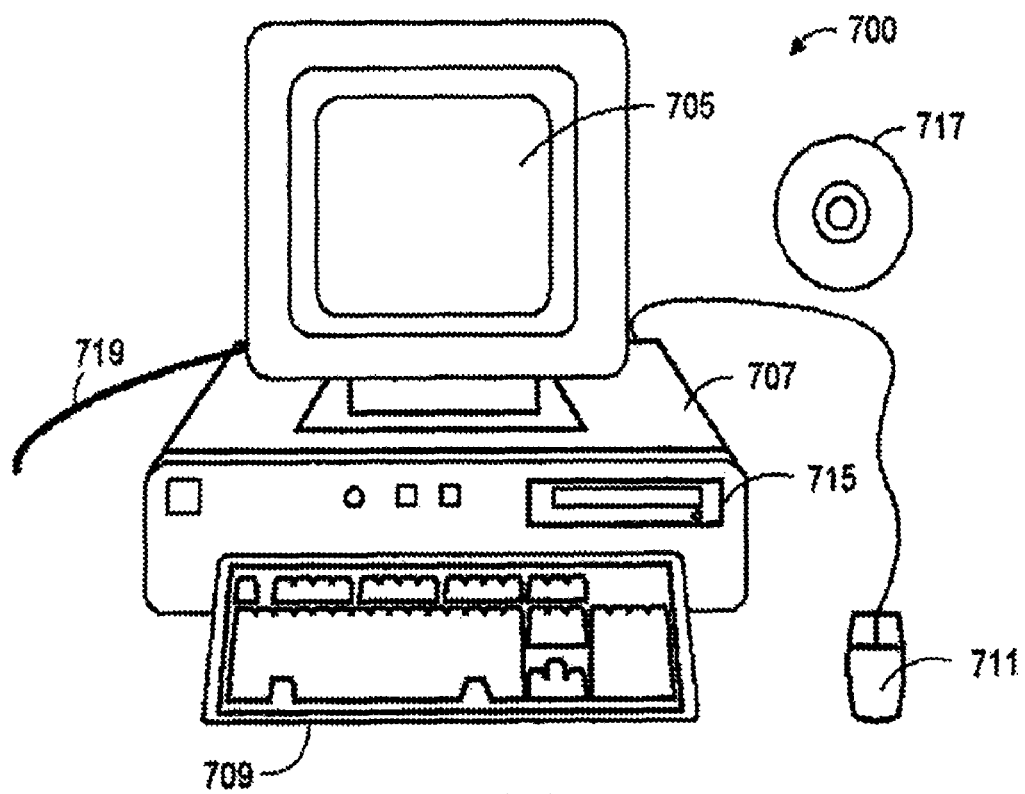
FIG. 8 is a block diagram showing a representative example logic device in which various aspects of the present invention may be embodied.

FIG. 7 is a block diagram illustrating an example document or format with security and encryption fields according to a specific embodiment of the invention. Although FIG. 8 shows one example of a document format, it should be understood that the invention may work with many different document formats. The invention can work with a document format that allows for arbitrary metadata, where metadata is defined as extra content that is not normally visible in the document viewer. The invention uses the metadata feature to store values such as (but not limited to) Document ID, Bibliographic Data such as Author, Title, Publisher, and Keywords, and security information such as checksums and digital signatures. A number of well-known file formats can store data generally as shown in FIG. 7, including HTML, PDF, or Microsoft Word. The invention may also be used with a propriety file format. In PDF (Portable Document Format) metadata can be stored in the Document Info and Encryption Dictionaries.

As an alternative, a document format may already allow encryption, in which case in some implementations, metadata is not needed. Furthermore, when implement with a custom or customizable viewer, a system according to the invention could store a document ID in the URL or other locator string for the document, instead of in metadata, and store all other metadata separately on the server using the document 10 as an access key.

The Encrypted Document Contents can be stored in the normal content area of the document or the Encrypted Contents can be stored in the metadata area.

4. Searching

In a further embodiment, a system as described herein is combined with advanced searching capabilities both in individual documents and in a document library. These advanced searching capabilities allow users to quickly find information that they may be interested in purchasing.

According to the invention, searched text is highlighted and documents will open to the pages that contain the text requested. Users will be presented with more clues as to what is contained within the document, and will be able to limit their searches within specific document types, or within specific subjects.

Users will also be able to reorder search results to better examine the content available to them. Re-ordering the search results by date, subjects, publishers or document relevancy, provides capabilities that empower users to find what they are seeking.

Additionally, users can perform searches within results of the previous search, allowing the user to reduce the documents to exactly what they need to find. These capabilities do not exist currently for general Internet use.

The present invention has thus far been described in terms of general methods and/or systems. The previous description is intended to be a full and complete description and is believed to be sufficient to allow an ordinary practitioner in the art to make and use the invention. It will be understood to those of skill in the art that the described invention can be implemented in a wide variety of specific programming environments, using a wide variety of programming languages and wide variety of file types.

What follows are specific implementation examples of various specific embodiments according to the present invention. This following discussion is included for the purposes of fully disclosing best mode details presently contemplated by the inventors for practicing the invention. In some instances, the following discussion includes innovative elements specific to a particular implementation that are claimed as separate inventions in the attached claims.

Where specific examples are described in detail, no inference should be drawing to exclude other known examples from the broad description of the invention or the language of the claims. It is therefore intended that the invention not be limited except as provided in the attached claims and all allowable equivalents.

5. Specific Example Implementations

5.1 PDF File Format and Viewer

In one specific embodiment, the invention uses the PDF file format for encoding textual/graphics documents. In this embodiment, the invention may also use a standard PDF viewer that allows plug-in modules, such as Adobe Acrobat viewer.

There is a vast literature on the PDF format, and in this embodiment the invention takes advantage of many existing features of PDF and defines extensions to the format, as allowed by PDF, to optimize operation of the invention. Some existing features of PDF that are particularly useful for implementing this embodiment are described below. For further information, the reader is referred to available publications, including http://www.adobe.com/products/docserver/main.html; *The Acrobat PDF Bible*, Ted Padova; *Portable Document Format Reference Manual*, ver. 1.3, Adobe Systems Incorporated; *Getting Started Using the Adobe Acrobat Software Development Kit* (*SDK*), Adobe Developer Relations, and other documents available through www.adobe.com.

PDF is a file format used to represent a document in a manner independent of the application software, hardware, and operating system used to create it. A PDF file contains a PDF document and other supporting data. A PDF document contains one or more pages. Each page in the document may contain any combination of text, graphics, and images in a device- and resolution-independent format. This is the page description. A PDF document may also contain information possible only in an electronic representation, such as hypertext links, sound, and movies. In addition to a document, a PDF file contains the version of the PDF specification used in the file and information about the location of important structures in the file.

PDF and the PostScript language share the same imaging model, but there are fundamental differences between them. A PDF file may contain objects such as hypertext links and annotations that are useful only for interactive viewing. To simplify the processing of page descriptions, PDF provides no programming language constructs. PDF enforces a strictly defined file structure that allows an application to access parts of a document randomly.

Since Adobe Acrobat 2.0, it has become easy for third parties to add private data to PDF documents and to add plug-ins that change viewer behavior based on this data. A PDF producer or Acrobat viewer plug-in may define new action, destination, annotation, and security handler types. If a user opens a PDF document and the plug-in that implements the new type of object is unavailable, standard viewers will behave in a default manner. In one embodiment, the present invention adds private data as meta-data to PDF files and in a viewer plug-in adds new security actions and modifies existing standard actions, such as print and copy.

A PDF producer or Acrobat plug-in may also add keys to any PDF object that is implemented as a dictionary except the trailer dictionary. In addition, a PDF producer or Acrobat plug-in may create tags that indicate the role of Marked Content operators. PDF files may be encrypted so that only authorized users can read them. In addition, the owner of a document can set permissions that prevent users from printing the file, copying text and graphics from it, or modifying it. The Acrobat core API uses RC4 (a proprietary algorithm provided by RSA Data Security, Inc.) to encrypt document data, and a standard proprietary method to encrypt, decrypt, and. verify user passwords to determine whether or not a user is authorized to open a document. The code that performs user authorization and sets permissions is known as a security handler. The Acrobat core API has one built-in security handler. This security handler supports two passwords-a user password that allows a user to open and read a protected document with whatever permissions the owner chose, and an owner password that allows a document's owner to also change the permissions granted to users.

Third-party plug-ins can use the Acrobat core API's built-in security handler, or can provide their own security handlers to perform user authorization in other ways (for example, by the presence of a specific hardware key or file, or by reading a magnetic card reader.) A security handler provided by a plug-in can, if it chooses, use the Acrobat viewer's built-in dialog boxes for entering passwords and for changing permissions.

The standard encryption handler in PDF stores the encryption key within an encryption dictionary that also stores two passwords: one for "Open" (allows user to open the document for 'read-only') and one for "Owner" (allows full modification of the file). These passwords are checked before the encryption key is pulled out of the encryption dictionary and passed to Acrobat to allow decryption of the file. In a specific embodiment, the present invention encryption handler pulls the encryption key directly from the server based on a document identifier stored in the file and only allows opening the file for read-only, never for modification.

5.2 Other Document Formats

While the invention, in a specific embodiment, makes use of a number of features provided under the PDF format and in available PDF viewers, the invention may also provide access to documents in other formats. In particular, the invention can include in its document database executable files, and audio or video files, which generally are not encoded in PDF.

The invention can also be adapted for use with document formats, such as MS Word, which, as is known in the art, also allow for meta-data and allow for one or more associated passwords and encrypted files. Another possible format is an encrypted version of HTML, which also allows for meta-data.

For whatever document format is used, the invention uses a viewer that can work with code to handle aspects of security, copying, and printing. In addition, the standard document viewer(s) for a given format may be used with the present invention where the viewers allow for plug-in code to handle these aspects. Standard HTML viewers and other document viewers may also allow for the necessary plug-in code. For file types, where the standard viewers do not allow for the necessary plug-in control, the invention can use custom viewers.

5.3 Copy Text & Graphics Interruption

As known in the art, sets of routines in the Acrobat Software Developers Kit (SDK) handle object-oriented selection of objects. There is a structure for text and another for graphics. In accordance with a specific embodiment, the invention leaves the AVDocSelectionCanCopyProc alone, because the invention in this embodiment allows the user to try to copy. The invention, however, replaces the standard selection server for text and graphics, and further replaces the callback AVDocSelectionCopyProc in order to implement authorization and billing. Note that the term "selection server" has specific meaning within the Adobe Acrobat SDK, and readers are referred to that document for details.

5.4 Print Interruption

In a specific embodiment, procedures referred to as AVDocDoPrint( ) AVDocPrintPagesWithParams( ) AVDocPrintPages( ) and PDDocWillPrintPages( ) are invoked when a user wants to print a document. According to one specific example embodiment of the invention, these procedures are replaced and printing is performed generally according to the following steps:

1. If this is not a document encrypted by a system according to the invention, defer to standard print handler.
2. Display a platform-specific standard print dialog. In other embodiments, this may be replaced with a callback provided by the document viewer API (not currently available in Acrobat).
3. Get user parameters. These parameters can be checked for possible security holes (e.g. printing to a file) and the user's choice overridden for security in this embodiment. In a further embodiment, the invention will also be checking that the destination printer driver is an accepted one so that a user cannot hijack the data via replacing the printer driver with a dummy one, and printing can be aborted with an error dialog.
4. Get user account ID (login name and password). In the current embodiment, this is accomplished via a dialog. In future embodiments, it may be obtained from stored information or other sources (card key, etc).
5. Verify user account information and retrieve price information (in one embodiment, retrieved via a servlet from an SQL database available remotely over the network. Parameters supplied to the database are document ID and page range; the former may come from data stored in the document info dictionary and the latter from a user selection or user input values into the print dialog GUI).
6. Present cost information to user.
7. If user declines the cost, abort printing.
8. If user accepts, send the accumulated information back to the transaction server to record and commit the transaction and await acknowledgement from the server. If acknowledgement is not received, abort printing
9. Call the standard print handlers to do the actual printing.

6. Embodiment in a Programmed Digital Apparatus

The invention may be embodied in a fixed media or transmissible program component containing logic instructions and/or data that, when loaded into an appropriately configured computing device, cause that device to perform interpolation according to the invention.

FIG. 8 is a block diagram showing a representative example logic device in which various aspects of the present invention may be embodied. FIG. 8 shows digital device 700 that may be understood as a logical apparatus that can read instructions from media 717 and/or network port 719. Apparatus 700 can thereafter use those instructions to direct a method of image interpolation. One type of logical apparatus that may embody the invention is a computer system as illustrated in 700, containing CPU 707, optional input devices 709 and 711, disk drives 715 and optional monitor 705. Fixed media 717 may be used to program such a system and could represent a disk-type optical or magnetic media or a memory. Communication port 719 may also be used to program such a system and could represent any type of communication connection.

The invention also may be embodied within the circuitry of an application specific integrated circuit (ASIC) or a programmable logic device (PLD). In such a case, the invention may be embodied in a computer understandable descriptor language which may be used to create an ASIC or PLD that operates as herein described.

The invention also may be embodied within the circuitry or logic processes of other digital apparatus, such as cameras, displays, image editing equipment, etc.

7. Example Screen Images

FIGS. 9-16 are example screen images from an exemplary embodiment. These images are presented as examples of program displays according to one specific system embodying the invention. As is known in the art, many variations are possible for interacting with logic systems, and the disclosure of these example images is not intended to limit the invention.

Figure 9:
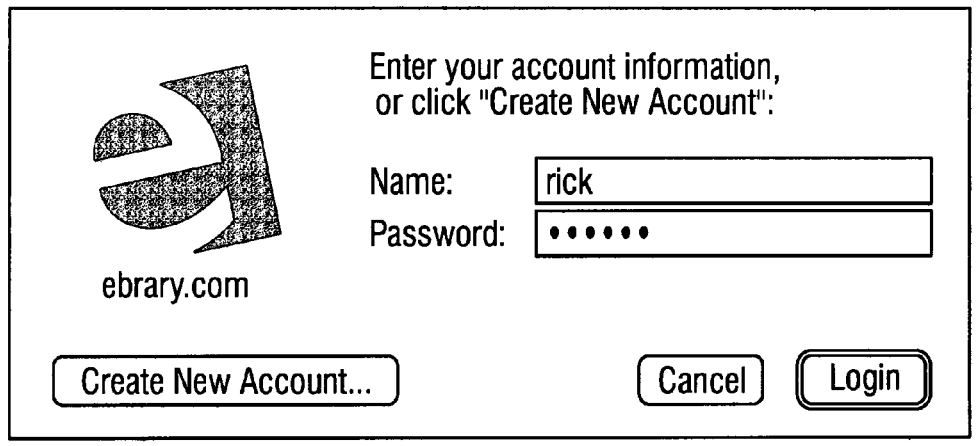

FIG. 9 shows the user login dialog. Using this dialog, the user enters his/her Ebrary account name and password. The invention will use this information to verify the user's identity and authorize transactions charged to the user's account. If the user has no account, clicking the "Create New Account" button will open a Web page in the user's browser that will enable the user to apply to Ebrary for a new account.

Figure 10:
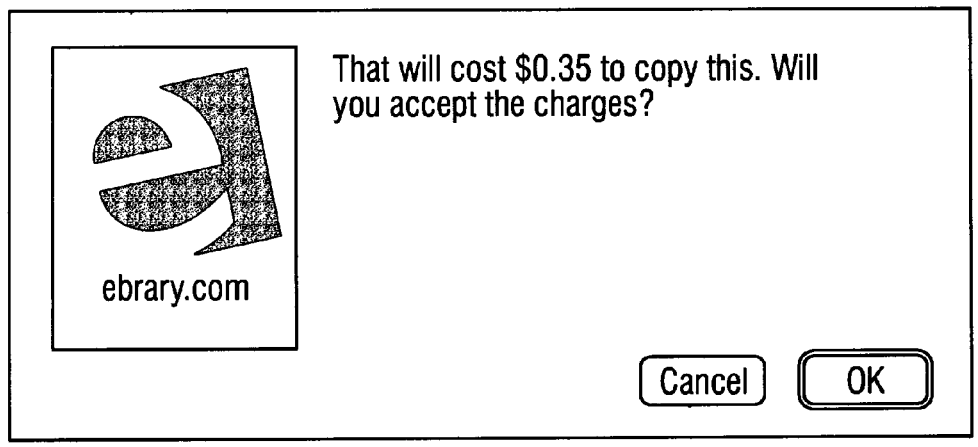

FIG. 10 shows the authorization dialog for the Copy operation. The user is presented with the cost of a requested copy operation. By clicking the OK button, the user authorizes the charge to his/her account, and enables the copy operation to proceed. By clicking the Cancel button, the user declines the charge, and the operation is aborted: no copying takes place and the user's account is not charged.

Figure 11:
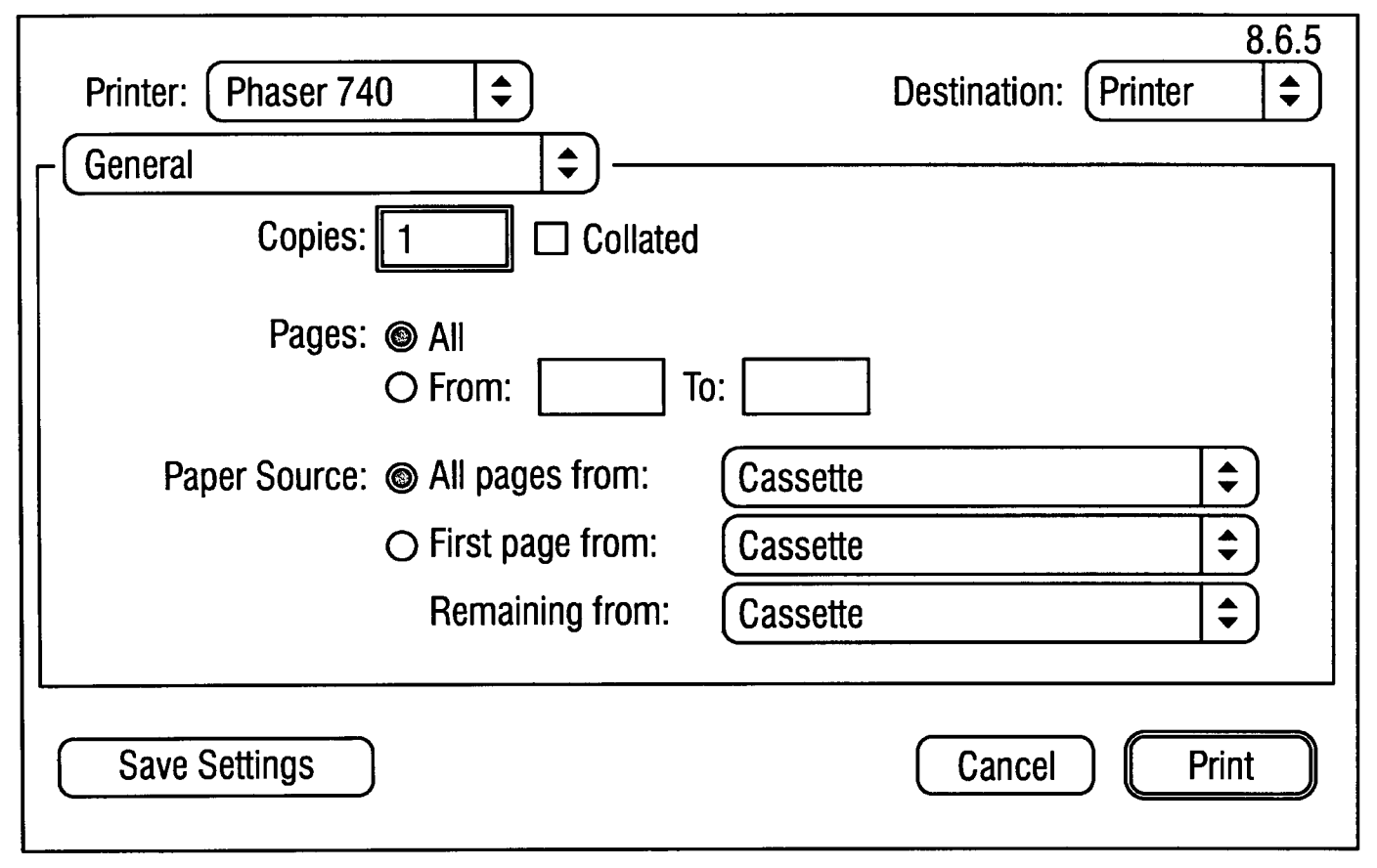

FIG. 11 shows the standard print dialog for one of the systems that supports an embodiment of the invention. This dialog is provided by the operating system, not the invention; but in some embodiments it is presented as a result of the invention's direct request. The user will enter a page range and other information affecting the requested print operation; the invention will harvest some or all of that information in order to help determine authorization and cost for the operation.

Figure 12:
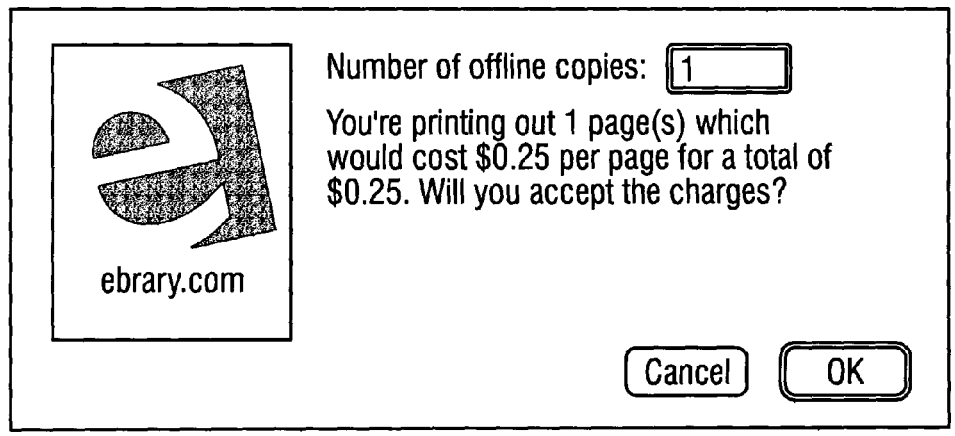

FIG. 12 shows the authorization dialog for the Print operation. The user is presented with the cost of a requested print operation. By clicking the OK button, the user authorizes the charge to his/her account, and enables the print operation to proceed. By clicking the Cancel button, the user declines the charge, and the operation is aborted: no printing takes place and the user's account is not charged.

Figure 13:
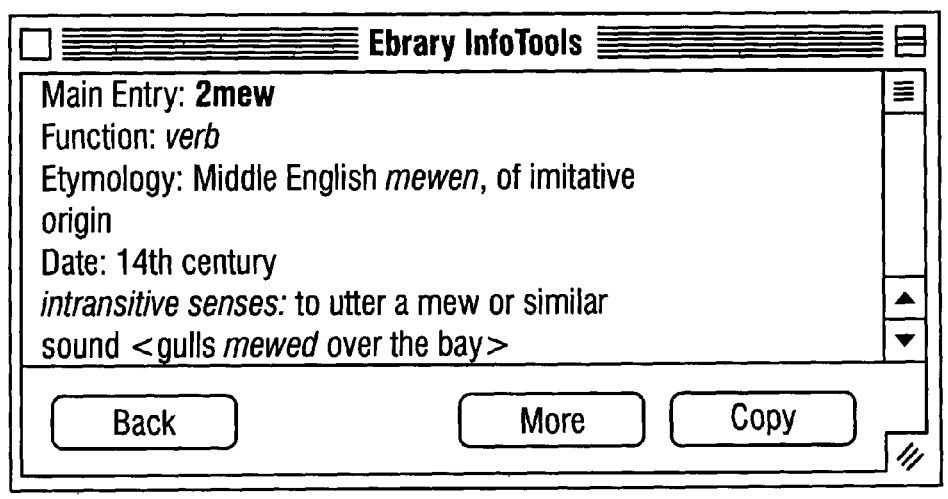

FIG. 13 shows the InfoTools Window in which information requested by the user is sometimes displayed. In this picture, a portion of a word definition is displayed. This window may also be used to display other kinds of information, including but not limited to translations of selected text into other languages.

Figure 14:
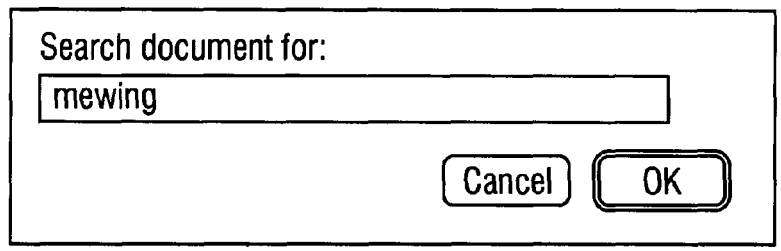

FIG. 14 shows the Search Document dialog. Using this dialog, the user enters a text string to be searched for. When the OK button is clicked, the invention queries its database and search engine via the network to determine the locations within the currently-displayed document where that text (or similar text) occurs. The reply from the server enables the invention to quickly display those locations.

Figure 15:
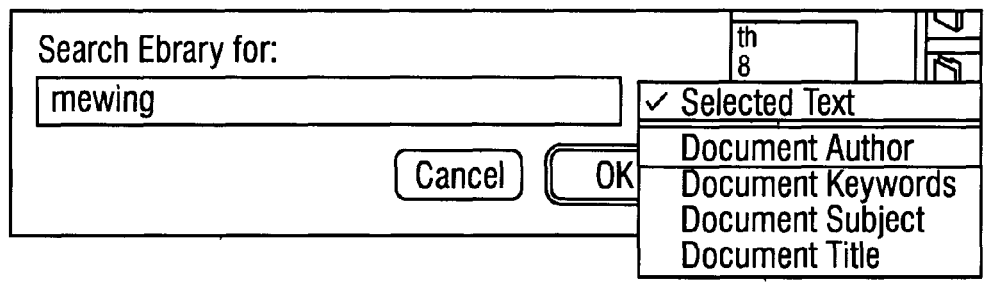

FIG. 15 shows the Search Ebrary dialog, with a popup menu displayed. Using this dialog, the user enters a text string to be searched for. The popup menu allows the user to easily enter certain strings pertinent to the document including the currently selected text and the document's title, author, subject, and keywords; however the user may also enter any arbitrary string. When the OK button is clicked, the invention queries its database and search engine via the network to compile a list of documents in which that text (or similar text) occurs. The results of the search are displayed in the user's Web browser.

Figure 16:
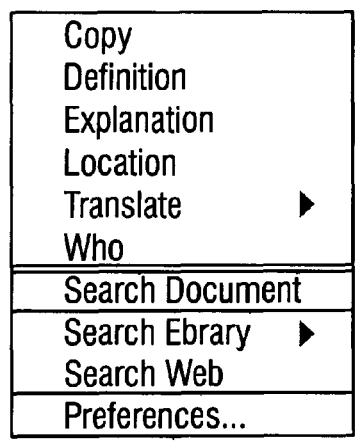

FIG. 16 shows a version of the InfoTools menu, which gives access to the InfoTools features while the user is viewing a document. The menu offers the user controls for performing searches, looking up information on the Internet, copying text to the clipboard, performing language translations, and viewing and adjusting the user's preferences with regard to the operation of InfoTools.

8. Conclusion

The invention has now been explained with regard to specific embodiments. Variations on these embodiments and other embodiments will be apparent to those of skill in the art. The invention therefore should not be limited except as provided in the attached claims. It is understood that the examples and embodiments described herein are for illustrative purposes only and that various modifications or changes in light thereof will be suggested to persons skilled in the art and are to be included within the spirit and purview of this application and scope of the appended claims. All publications, patents, and patent applications cited herein are hereby incorporated by reference in their entirety for all purposes.

What is claimed is:

1. A computer-implemented method for user access to document content using a logic client device comprising:
    delivering, by a document server, to a user of said client logic device a first user viewable version of the actual contents of a specific document residing at said document server on a first cost basis;
    protecting, by a security server, said first user-viewable version to prevent the user from performing a standard operation on said version, said standard operation consisting of any of copying, printing, or saving;
    calculating, by a transaction server, a charge to permit the user to perform a requested standard operation on a user-selected portion of said specific document on a second cost basis; and
    delivering, by said document server, to said user a second version of the actual contents of said specific document residing at said document server comprising said user-selected portion of said specific document, wherein a user requested standard operation is completed in coordination with said document server upon payment of the calculated charge.

2. The method according to claim 1 wherein calculating the charge further comprises:
    calculating the charge on the basis of the granularity of the user-selected portion including whole and partial pages.

3. The method according to claim 1 wherein calculating the charge further comprises:
    calculating the charge based in part on the standard operation requested.

4. The method according to claim 1 wherein calculating the charge further comprises:
    calculating said charge in part on a network address from which said user accesses said server.

5. The method according to claim 1 further comprising:
    presenting the calculated cost to the user; and
    receiving user authorization for payment of the calculated charge.

6. The method according to claim 5 further comprising:
    checking a user's default options and providing authorization according to said default options.

7. The method according to claim 1 further comprising:
    determining whether a user wants multiple copies of said document; and calculating a charge for said multiple copies of said document.

8. The method according to claim 7 wherein completing the requested standard operation further comprises:
    providing a certificate allowing authorized reproduction of a number of copies.

9. The method according to claim 1 wherein user-selected portion may include an anthology from multiple documents.

10. The invention of claim 1, wherein delivering the first user-viewable version further comprises:
    delivering document contents to the user in an encrypted format.

11. The invention of claim 10, further comprising:
    using client-side software for permitting the user to view the encrypted format of the first version.

12. The invention of claim 1, wherein delivering the first user viewable version further comprises:
    delivering document content at a resolution sufficient for viewing but not for satisfactory completion of the requested standard operation.

13. The invention of claim 12 wherein delivering the second version further comprises:
    delivering document content in a higher resolution on which satisfactory completion of the requested standard operation may be performed.

14. The invention of claim 12 wherein delivering the second version further comprises:
    delivering document content in a form not directly accessible by the user.

15. The invention of claim 1, wherein delivering the first version further comprises:
    delivering document content in a form viewable by the user only upon authorization from a third party.

16. The invention of claim 15 wherein delivering document content in a form viewable by the user only upon authorization from a third party further comprises:
    delivering authorization for viewing by the user only as the document content is being delivered from the server.

17. The method according to claim 15 wherein delivering the first user-viewable version further comprises:
    delivering a full-text searchable version of said document content, and displaying documents opened for browsing to portions containing search terms which are highlighted.

18. The invention of claim 15 wherein delivering the first user-viewable version further comprises:
    delivering images of a page of the document content one at a time to the user for viewing.

19. The invention of claim 16, wherein delivering the second version further comprises:
    delivering the entire user selected document content to the user at one time.

20. The method of claim 1 wherein delivering the second version further comprises:
    delivering text in a first structure and graphics in a different structure.

21. The method of claim 20 wherein calculating the charge further comprises:
    calculating the charge on the bases of the user-selected portion including text and on the basis of the user selected portion including graphics.

22. A computer-implemented method for purchasing information from a server, comprising:
    delivering, by a document server, to a user of said client logic device user-requested pages of a specific document in a first user-viewable version;
    protecting, by a security server, said first user-viewable version to permit said user viewing the actual contents of said pages of said specific document and selecting by said user, but not printing, copying, or saving by the user;
    calculating, by a transaction server, a charge to permit a requested standard operation to be performed on a user-selected portion of said specific document; and delivering, by said document server, to said user a second version of the actual contents of said specific document, said second version consisting of the user-selected portion of said specific document, said delivering step being performed in coordination with said security server upon authorization of payment of the calculated charge, said second version comprising a version on which the standard operation is performed.

23. The method according to claim 22 wherein calculating the charge further comprises:
calculating the charge on the basis of the number of full and partial pages in the user-selected portion.

24. The method according to claim 22 wherein calculating the charge further comprises:
calculating the charge on the basis of the type of standard operation to be performed.

25. The method of claim 22, wherein delivering the user-requested pages of said specific document further comprises:
serving low resolution images of full pages of information.

26. The method of claim 25, wherein delivering the user-selected portion further comprises:
delivering text within the user-selected portion of the low resolution images in the form of text on which the standard operation may be performed.

27. The method of claim 25 wherein delivering the user-selected portion further comprises:
delivering images within the user-selected portion of the low resolution images in the form of high resolution images on which the standard operation may be performed upon authorization of the charges.

28. The method of claim 22, further comprising:
encrypting the user-requested pages of said specific document before delivering them to the user; and
requiring authorization from a third party before permitting viewing and selecting of user-requested pages by the user.

29. The method of claim 28 further comprising:
encrypting the user-selected portion before delivering the user-selected portion to the user; and
requiring authorization from the third party before the standard operation may be performed.

30. The method of claim 25 wherein delivering the user-selected portion further comprises:
delivering images within the user-selected portion of the low resolution images in the form of high resolution images on which the standard operation may be performed upon authorization of the charges.

31. The method of claim 22, wherein delivering the user-requested pages further comprises:
delivering the user-requested pages of said specific document in a low resolution format sufficient for permitting viewing and selecting by a user but not sufficient for acceptable printing, copying, or saving by the user.

32. The method of claim 31 wherein delivering the user-selected portion further comprises:
delivering the user-requested portion in a high resolution format sufficient for acceptable printing, copying and/or saving by the user.

33. The method of claim 22, wherein delivering user-requested pages of said specific document further comprises:
delivering user-requested text in the form of low resolution images of pages of text suitable for viewing and selecting.

34. The method of claim 33, wherein delivering the user-selected portion further comprises:
delivering user-selected text suitable for performing the standard operation is performed.

35. The method claim 22, wherein delivering user-requested pages of said specific document further comprises:
delivering user-requested page images in the form of low resolution images suitable for viewing and selecting.

36. The method of claim 33, wherein delivering the user-selected portion further comprises:
delivering user-selected images in the form of high resolution images suitable for performing the standard operation.

37. The method of claim 22, wherein delivering user-requested pages of said specific document further comprises:
delivering user-requested text and images in the form of low resolution images of pages of text and images suitable for viewing and selecting.

38. The method of claim 37, wherein delivering the user-selected portion further comprises:
delivering the user-selected text in the form of text suitable for said standard operation; and
delivering images in the form of high resolution images suitable for performing the standard operation.

39. The method according to claim 1, wherein any and all versions of said specific document delivered to said user are delivered by said document server.

* * * * *